United States Patent

Edgerton et al.

[11] Patent Number: 5,835,298
[45] Date of Patent: Nov. 10, 1998

[54] HARD DRIVE PROTECTION SYSTEM AND METHOD

[75] Inventors: John W. Edgerton, Akron; Gary Kochis, Uniontown, both of Ohio

[73] Assignee: Telxon Corporation, Akron, Ohio

[21] Appl. No.: 699,018

[22] Filed: Aug. 16, 1996

[51] Int. Cl.⁶ .................................................. G11B 21/12
[52] U.S. Cl. ............................................. 360/75; 360/69
[58] Field of Search ................................ 360/75, 60, 69, 360/71

[56] References Cited

U.S. PATENT DOCUMENTS

| | | | |
|---|---|---|---|
| Re. 35,269 | 6/1996 | Comerford | 360/75 |
| 4,862,298 | 8/1989 | Genheimer et al. | 360/60 |
| 5,227,929 | 7/1993 | Comerford | 360/75 |
| 5,235,472 | 8/1993 | Smith | 360/60 |
| 5,373,213 | 12/1994 | Smith . | |
| 5,392,290 | 2/1995 | Brown et al. | 360/60 X |
| 5,436,838 | 7/1995 | Miyamori . | |
| 5,441,300 | 8/1995 | Yokota et al. . | |
| 5,490,411 | 2/1996 | Hogan . | |
| 5,521,772 | 5/1996 | Lee et al. | 360/75 |
| 5,537,270 | 7/1996 | Morehouse et al. . | |

FOREIGN PATENT DOCUMENTS 6-203505  7/1994  Japan ................................. 360/75 H

*Primary Examiner*—Aristotelis M. Psitos
*Assistant Examiner*—James L. Habermehl
*Attorney, Agent, or Firm*—Renner, Otto, Boisselle & Sklar, P.L.L.

[57] ABSTRACT

A protection system for a hard drive in a portable computing device in which the hard drive is placed in a protective state based on the kinetic energy of the hard drive exceeding a determined threshold. Upon determination that the threshold has been exceeded, the protection system takes steps to protect the hard drive so that the hard drive will be less susceptible to damage from impact.

22 Claims, 5 Drawing Sheets

HARD DRIVE PROTECTION SYSTEM AND METHOD

Technical Field

The present invention relates generally to a protection system for a hard drive and a method for protecting a hard drive. More particularly, the present invention relates to a protection system for hard drives in which the hard drive is put in a protected state based on the kinetic energy of the hard drive.

BACKGROUND OF THE INVENTION

In recent years, the use of portable computing devices such as lap top computers, hand held inventory control devices, etc. has become widespread. Such devices have much the same features as desk top devices but are portable and thus provide for performing powerful computing and/or data processing operations at a remote location. Hard drives have contributed much to the advancement in portable computing devices. Hard drives are probably the most-utilized all-around storage medium to provide non-volatile storage for computer programs and/or the information they generate. Hard drives store and retrieve data quickly, have relatively large storage capacity, and are inexpensive on a cost-per-megabyte basis.

However, portable computing devices and the hard drives included therein are subject to various forms of failure that desk top versions typically are not. For example, oftentimes, portable computing devices are subject to being dropped due to the fact that these devices are intended to be transported frequently from location to location and in many cases are intended to be used in a moving hand-held environment. Hard drives within such devices are particularly vulnerable to shock because hard drives depend on the maintenance of a very small gap between the drive heads and the disk platters. The size of the gap is a key factor in the quantity of data which can be stored on the disk. In general, the smaller the gap, the more the data which can be stored. Consequently, small, and hence vulnerable gap dimensions are the rule for hard drives. The technology routinely used to obtain small gap height is aerodynamic. The heads are literally flown over the platter surface to place the heads as close to the platters as possible without allowing contact. If the heads were to contact the platter due to the hard drive being dropped, for example, the result could be both the destruction of the heads and the removal of the magnetic material (and hence the loss of data) from the platter.

Previous attempts to address the problems associated with damage to hard drives which are, for example, dropped have met with only limited success. U.S. Pat. No. 5,227,929 discloses a system which uses a three axis accelerometer mounted in a portable computer. The output of the accelerometer is continuously monitored, and in the event of an acceleration within a preset range of values close to 1G, a high priority interrupt is generated in order to park the disk heads.

However, this conventional system is limited in that it simply determines from the accelerometer when the computer is in free fall. When the measured acceleration is approximately equal to the acceleration due to gravity, the system parks the hard drive. However, there are numerous situations where the acceleration of the hard drive does not approach free fall but the hard drive can still sustain damage upon impact. Consequently, this conventional system is unable to protect the hard drive from various commonly occurring mishaps associated with, for example, swinging of the portable computing device (housing the hard drive) from a shoulder strap or sliding of the device down an incline plane, etc.

In particular, such a conventional system is not suitably responsive for placing the hard drive in a protected state. For instance, a hard drive that is placed in motion along a given plane has a threshold velocity associated therewith where impact of the device at such velocity would result in damage to the device. The threshold is generally a function of both the amount of shock which can be safely absorbed by the mechanical mounting of the hard drive and the amount of time required to place the hard drive in a protected state. The conventional system above does not contemplate the potential damage sustainable to the hard drive due to the threshold velocity being exceeded. As a result, the hard drive may have already reached a point where it will sustain damage even though the acceleration level needed to initiate protective steps by the system has not been reached yet. Thus, the conventional system does not adequately address a substantial range of situations where the hard drive is in danger of being damaged upon impact. In view of the aforementioned shortcomings associated with existing systems and techniques for protecting the hard drive of a portable computing device, there is a strong need in the art for a system which addresses wider range of mishaps which are likely to occur as a result of ordinary use.

SUMMARY OF THE INVENTION

The present invention relates to a protection system for hard drives in portable computing devices in which the hard drive is placed in a protected state based on the translational velocity squared (i.e., kinetic energy) of the hard drive exceeding a determined threshold. If it is determined that the threshold has been exceeded, the protection system takes steps to protect the hard drive such as, for example, parking the heads of the hard drive, and/or dynamically braking the hard disk(s) and or powering down the hard drive, etc. In this manner, the hard drive will be less susceptible to damage from impact. Accordingly, the protection system of the present invention, by contemplating the translational velocity of the hard drive, is predictive of a wide range of mishaps that could result in damage to the hard drive.

In accordance with one particular aspect of the invention, a protection system for a hard drive is provided, including: a multi-axis accelerometer for generating signals proportional to local acceleration of the hard drive; and a processor for monitoring the signals generated by the accelerometer and determining a translational velocity of the hard drive due to acceleration based on the signals generated by the accelerometer, the processor being operative to issue a command to help protect the hard drive from damage due to impact upon determination that the translational velocity of the hard drive due to acceleration exceeds a threshold translational velocity.

In accordance with another aspect of the invention, a protection system for a hard drive is provided, including: a multi-axis accelerometer for generating signals proportional to local acceleration of the hard drive; and a processor for monitoring the signals generated by the accelerometer and determining a translational velocity of the hard drive due to acceleration based on the signals generated by the accelerometer, the processor being operative to issue a command to protect the hard drive upon determination that the translational velocity of the hard drive exceeds a threshold translational velocity; wherein the translational velocity of the hard drive is determined based on a measured local acceleration vector and a measured local acceleration vector due to gravity.

According to still another aspect of the invention, a protection system for a hard drive is provided, including: an accelerometer for generating signals proportional to local acceleration of the hard drive; and a processor for monitoring the signals generated by the accelerometer, the processor being operative to issue a command to protect the hard drive upon determining that a translational velocity vector of the hard drive is of such magnitude that the hard drive would sustain damage upon impact.

In accordance with yet another aspect of the invention, a method for protecting a hard drive is provided, including the steps of: employing a multi-axis accelerometer to generate signals proportional to the local acceleration of the hard drive; using a processor to monitor the signals generated by the accelerometer and to determine a translational velocity of the hard drive due to acceleration based on the signals generated by the accelerometer; and initiating steps to protect the hard drive upon determining that the translational velocity of the hard drive exceeds a threshold translational velocity; wherein the translational velocity of the hard drive is determined based on a measured local acceleration vector and a measured local acceleration vector due to gravity.

To the accomplishment of the foregoing and related ends, the invention, then comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
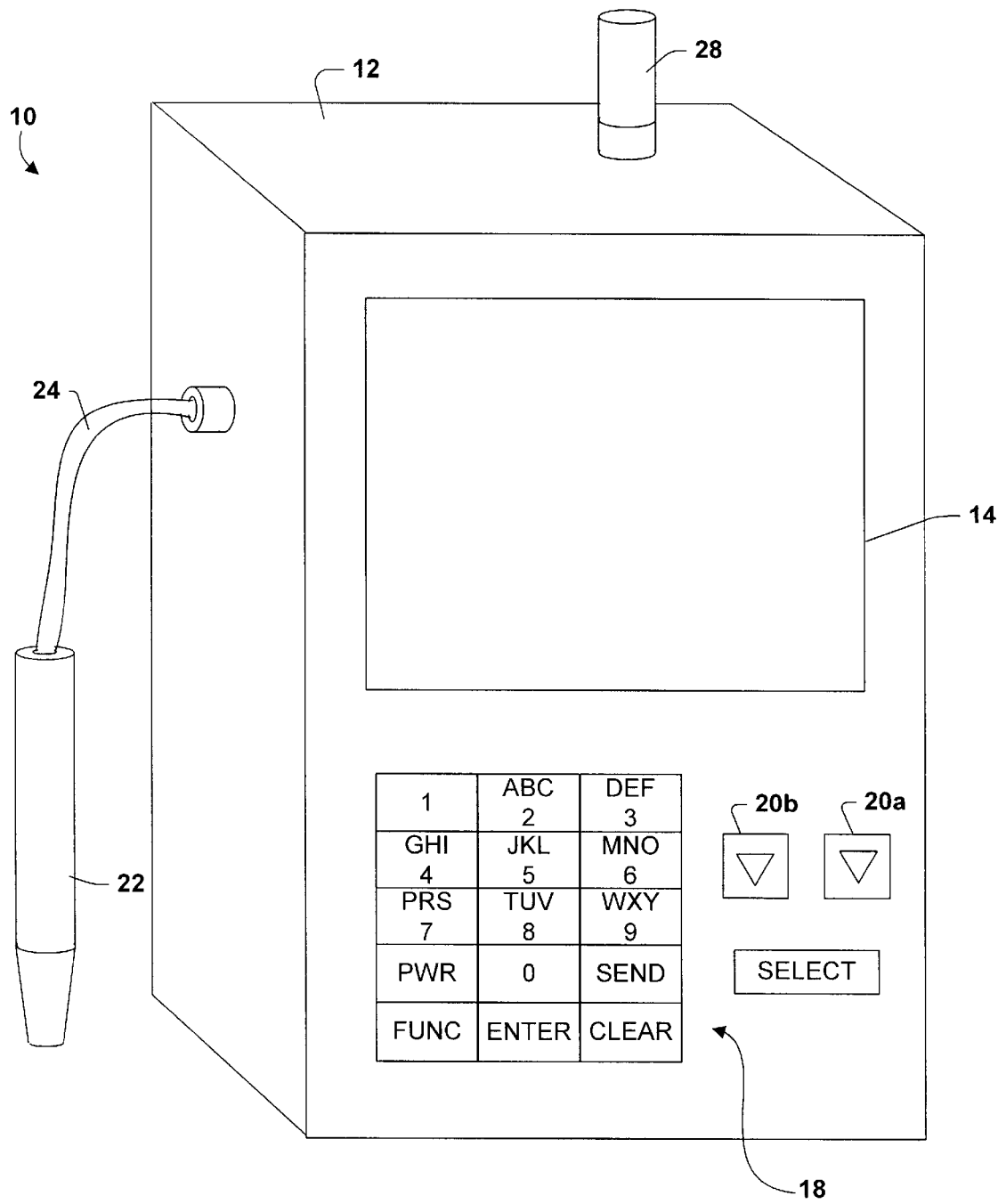
FIG. 1 is a perspective view of a portable computing device having a hard drive in accordance with the present invention.

The present invention will now be described with reference to the drawings wherein like reference numerals are used to refer to like elements throughout.

As is mentioned above, the present invention relates to protection systems for hard drives in portable computing devices such as lap top computers, notebook computers, hand held inventory control devices, etc. In the exemplary embodiments described hereinafter, each portable computing device is a hand held inventory control device known as a "mobile terminal" used to communicate data such as inventory or the like within a cellular, narrow band or other radio communication system including multiple mobile terminals and base stations. However, it is recognized that the invention contemplates other types of portable computing devices and is not intended to be limited to hand held inventory control devices or devices which must wirelessly communicate information.

Referring initially to FIG. 1, a mobile terminal 10 is shown in accordance with the present invention. The terms "mobile terminal" and "portable computing device" are used interchangeably throughout the specification. The mobile terminal 10 includes a portable housing 12 which houses a hard drive 13 (FIG. 2) and is preferably made of metal, high strength plastic, or the like. The mobile terminal 10 includes a display 14 such as a liquid crystal display or the like. As is conventional, the display 14 functions to display data or other information relating to ordinary operation of the mobile terminal 10 in a cellular communication system. For example, the display 14 may display inventory information, pricing details, etc. which is to be transmitted to or is received from a system backbone.

The mobile terminal 10 further includes an operator input device 18 in the form of a keypad which enables a user to enter data, information, function commands, etc. as is conventional. For example, the user may input information relating to inventory via the keypad 18 for subsequent transmission to a base station. In addition, the keypad 18 includes up and down cursor keys 20a and 20b, respectively, for controlling a cursor which may be shown on the display 14. By selectively pressing the up and down cursor keys 20a and 20b, the user is able to move the cursor about the display 14.

The mobile terminal 10 also includes a bar code reader 22 in the form of a wand or the like which allows information to be input to the mobile terminal 10 via bar code symbols. The bar code reader 22 is coupled to the housing 12 by a cable 24 which provides the appropriate electrical connections between the bar code reader 22 and the circuitry contained in the housing 12.

Extending from the housing 12 is an antenna 28 for transmitting and receiving radio signals within a cellular communication system. In the exemplary embodiment, the antenna 28 is an omnidirectional antenna but other types of antennas are equally possible.

Figure 2:
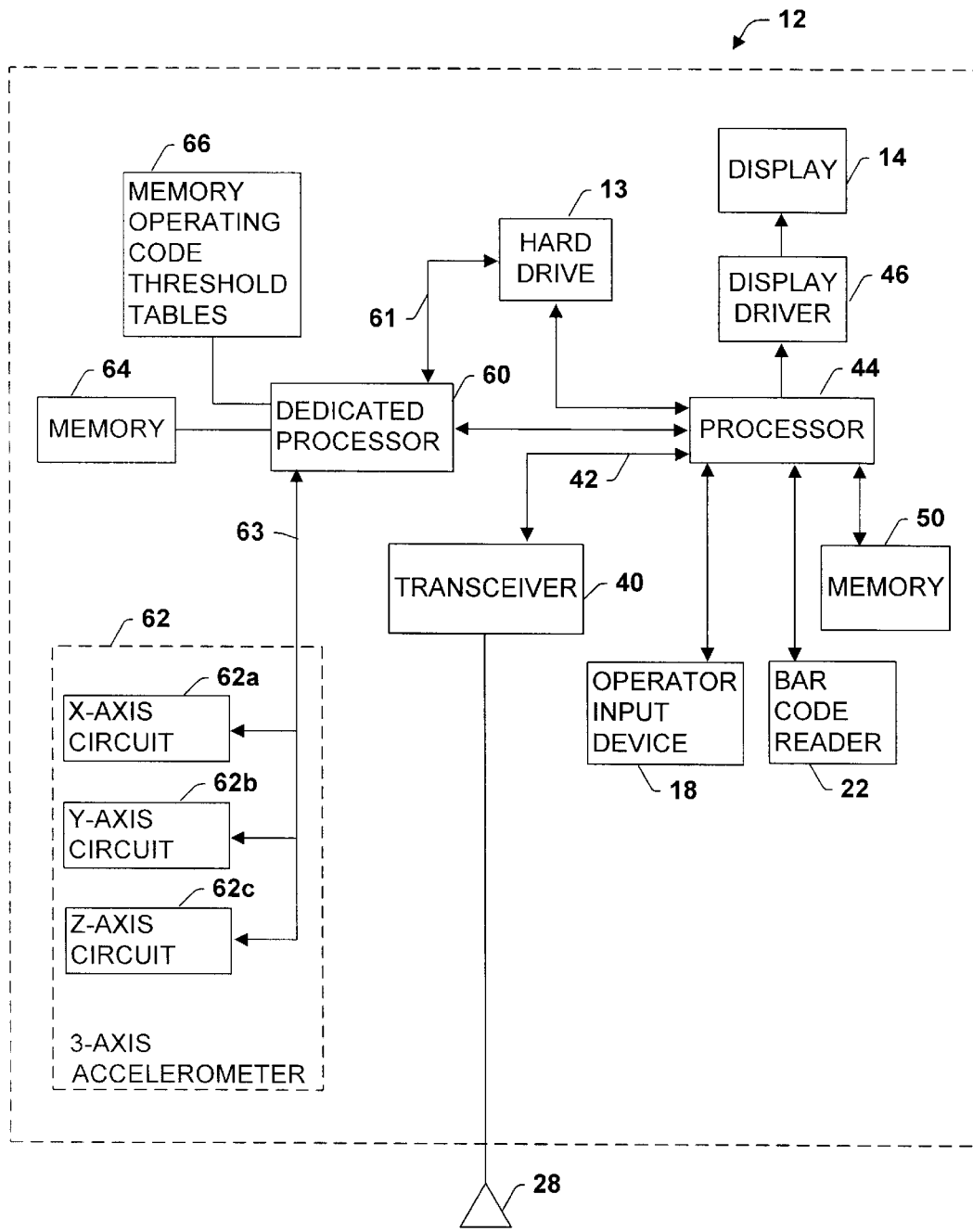
FIG. 2 is a functional block diagram of a portable computing device incorporating the protection system of the present invention.

Referring now to FIG. 2, a block diagram of the exemplary portable computing device is shown. As noted above, the mobile terminal 10 includes an antenna 28 for receiving and transmitting signals via a transceiver 40 to which it is connected. The transceiver 40 is coupled via a control/data bus 42 to a processor 44 included in the mobile terminal 10. The processor 44 is responsible for controlling the general operation of the mobile terminal 10 with respect to processing and storing information received and transmitted by the transceiver 40. The processor 44 is programmed to control and to operate the various components within the mobile terminal 10 in order to carry out various functions described herein. The operator input device 1 8 is coupled to the processor 44 which allows an operator to input data to be communicated to a system backbone (not shown) or local computer (not shown) such as inventory data, ordering information, and the like. The input device 18 can include such items as the aforementioned keypad, touch sensitive display, etc. The mobile terminal 10 also includes the bar code reader 22 coupled to the processor 44 for providing another form of data input.

The display 14 is connected to and controlled by the processor 44 via a display driver circuit 46. A memory 50 is included in the mobile terminal 10 for storing program code executed by the processor 44 for carrying out conventional operating functions of the mobile terminal 10. The memory 50 may also serve as a storage medium for temporarily storing information received from or intended to be transmitted to a base station (not shown) or a local computer (not shown).

With the exception of the antenna 28, the components making up the mobile terminal 10 are preferably housed in a palm-sized housing 12 represented in phantom. This makes the mobile terminal 10 highly portable and easy to carry from one cell to another within a cellular system.

A hard drive 13 is also included in the mobile terminal 10 and is coupled to the processor 44 and a dedicated processor 60. The processor 44 utilizes the hard drive 13 as a memory storage medium to store data which is collected by the mobile terminal 10, application software, etc., as is conventional. The dedicated processor 60, on the other hand, is responsible for controlling the hard drive protection system of the present invention in order to park the heads of the hard drive 13 and/or brake the disk(s) of the hard drive and/or power-down the hard drive in accordance with the present invention. Powering-down the hard drive includes parking the heads and/or braking the disk(s) and/or turning off the hard drive 13. As is described more fully below, the dedicated processor 60 issues commands to the hard drive 13 via control line(s) 61. The dedicated processor 60 is responsible for computing the translational velocity and velocity squared (i.e., kinetic energy) of the mobile terminal 10, and particularly the hard drive 13, due to acceleration. In the event the velocity squared (proportional to kinetic energy) of the hard drive 13 exceeds a predetermined threshold, the dedicated processor 60 issues one or more commands on line 61 to park the heads and/or stop the disk(s) within the hard drive 13 and or power-down the hard drive 13.

A multi-axis accelerometer 62 is mounted within the mobile terminal 10, and preferably is physically part of the hard drive 13. This particular embodiment illustrates a three-axis accelerometer 62 as is preferred, however, it is understood that an accelerometer that monitors more or less than three axes falls within the scope of this invention. The three-axis accelerometer 62 measures the local acceleration of the hard drive 13 in the X, Y and Z directions. Further, the three-axis accelerometer 62 may also measure the local acceleration of the device 10. The accelerometer 62 provides as its output on bus 63 signals indicative of the amount of acceleration of the hard drive 13 along the X, Y and Z axes at any given time. The output of the accelerometer 62 is input to the dedicated processor 60 which processes the acceleration data in the manner discussed below. Any suitable accelerometer or combination of accelerometers (preferably capable of measuring acceleration along three mutually orthogonal axes) may be employed as the accelerometer 62. For example, semiconductor based accelerometers are well suited due to ease of manufacture as well as low cost and small size associated therewith.

The dedicated processor 60 is programmed to numerically integrate an acceleration vector $\underline{A}$ of the portable computing device 10 and hence the hard drive 13 to obtain a velocity vector $\underline{V}$ of the hard drive 13, and from that determine the magnitude of the velocity squared ($V^2$) as described herein. The actual code for performing such functions could be easily programmed by a person having ordinary skill in the art of computer programming in any of a number of conventional programming languages based on the disclosure herein. Consequently, further detail as to the particular code has been omitted for sake of brevity. A memory 64 stores such code and also serves to store various parameters and variables utilized in such code as described herein.

Since velocity squared of the hard drive 13 is proportional to the kinetic energy of the hard drive 13, the protection system of the present invention (which is based on kinetic energy) will be predictive in nature.

The prediction is based on when the acquired translational velocity squared of the hard drive 13 has exceeded a threshold at which sudden arrest of the hard drive 13 would generate a shock greater than what can be absorbed by mechanical mounting of the hard drive 13 without damaging the hard drive 13. Such prediction allows for a signal generated by the dedicated processor 60 to initiate a command(s) provided to the hard drive 13 to place the hard drive 13 in a protected state such as, for example, turning off the hard drive 13 and/or parking the heads of the hard drive 13 and/or braking the spinning disk(s) of the hard drive 13 or any other known steps to appropriately protect the hard drive 13 from the shock of impact.

A memory 66 is tied to the dedicated processor 60 so that the dedicated processor 60 can quickly access and store code and information such as, for example, look-up tables. The details and advantages associated therewith are discussed in greater detail below.

Thus, the present invention predicts potential danger to the hard drive 13 and initiates protective action before impact, based on the acquired kinetic energy of the hard drive 13 and/or portable computing device 10. For instance, if a computer is dropped, it acquires kinetic energy while in free fall. When a threshold (indicative of danger of damage being sustained by the hard drive) is reached, the hard drive 13 is placed in a protected state. The threshold is based upon both the amount of shock which can be safely absorbed by the mechanical mounting and upon the amount of time required to place the hard drive 13 in a protected state. Therefore, by the time the portable computing device impacts, the hard drive 13 is already placed in a protected state thereby significantly minimizing potential damage.

Since portable computing devices are not typically employed during free fall or rapid motion, a temporary lack of hard drive function due to its being in a protected state will likely be transparent to the user. However, it is understood that the protective system of the present invention could be deactivated by, for example, a switch if the user desires to employ the portable computing device in a manner that would not place the hard drive in a protected state.

A suitable microcontroller (perhaps a 16-bit microcontroller with integer multiply instruction) or a digital signal processor or perhaps even a microprocessor may be used as the dedicated processor 60. A suitable microprocessor for the dedicated processor 60 should at a minimum have enough computational power to accommodate the number of bits representing the largest number possibly created by the process of the present invention—such largest number likely being $2E_{max}/m$ (explained in detail below). Additionally, such suitable dedicated processor should operate fast enough to execute the programming code to produce sufficiently fine time resolution in the data sampling rate.

The following equation is employed by the dedicated processor 60 to calculate the velocity vector $\underline{V}$:

$$\underline{V} = \int \frac{\partial \underline{V}}{\partial t} ; \text{ where } \frac{\partial \underline{V}}{\partial t} = \underline{A} - \underline{G}$$

where:

$\underline{A} = (a_x, a_y, a_z)$ is the measured acceleration vector made up of the components provided by the x-axis, y-axis and z-axis circuits, 62a, 62b and 62c, respectively, of the accelerometer 62;

$\underline{G} = (g_x, g_y, g_z)$ is the measured local acceleration due to gravity;

g=is the "textbook" acceleration due to gravity ≈ 9.8 m/sec$^2$;

$\underline{V} = (v_x, v_y, v_z)$ is the translational velocity of the hard drive; and $A = |\underline{A}|$; $G = |\underline{G}|$; $V = |\underline{V}|$ are magnitudes of the vectors.

As mentioned above, the present invention is unlike conventional protection systems which simply protect the hard drive 13 when acceleration is approximately equal to the acceleration due to gravity. The protection system of the present invention computes the magnitude of the translational velocity $\underline{V}$ and consequently is predictive over a wider range of mishaps than conventional systems. The square of the translational velocity $V^2$ is employed for ease of computations. However, it is understood that $\underline{V}$ or any other relevant physical quantity and or function of velocity ($\underline{V}$) can be used. Once a value of $\underline{V}$ has been calculated by numerical integration of $\partial \underline{V}/\partial t$, a maximum threshold velocity squared (LimitV$_{sq}$) is determined based upon the equations below. Note, although the present embodiment employs numerical integration to calculate the maximum threshold velocity squared, such integration may be accomplished by other means such as, for example, lookup tables.

(1) E$_{max}$=the maximum allowable acquired energy of the hard drive; the sum of the shock the hard drive can sustain without damage and the amount of kinetic energy which can be absorbed by the hard drive mounting materials;

(2) t$_{Stop}$=the time required to place the hard drive in a safety state;

(3) Assuming that during t$_{STOP}$, the hard drive will acquire additional kinetic energy from fixed acceleration g;

Then:

E$_{max}$=(kinetic energy already acquired at the time a warning to place the drive in a protected state is issued)+(the amount of kinetic energy acquired during t$_{STOP}$);

E$_{max}$=½(m)(LimitV$_{sq}$)+mgh;

where:

m=mass of the hard drive h=the distance the hard drive falls during t$_{stop}$; assuming a direction upward (opposite to the direction of the pull of gravity) has a positive convention, then h which is in a downward direction results in a G with a negative convention in the following equation;

$h = (\underline{V}_{component}$ in the direction of $-\underline{G}) \times t_{stop} + \frac{1}{2}(g)(t^2_{stop})$.

The $\underline{V}_{component}$ (in the direction of $-\underline{G}) = \underline{V}\cos(\theta)$ where θ is the angle between $\underline{V}$ and $-\underline{G}$. The resulting trigonometric function is more easily conveyed in vector dot product form as:

$h = ((\underline{V} \cdot \underline{G})t_{stop} + \frac{1}{2}(g)(t^2_{stop})$;

where:

$\underline{V} \cdot \underline{G} = -(v_x g_x + v_y g_y + v_z g_z)$.

With the approximation that g=G, the following results:

$$2gh = -2t_{stop}(v_x g_x + v_y g_y + v_z g_z) + g^2 t^2_{stop}$$

Thus:

½(m) (LimitV$_{sq}$)=E$_{max}$−mgh;

LimitV$_{sq}$=2(E$_{max}$/m−gh);

LimitV$_{sq}$=2E$_{max}$/m+2t$_{stop}$(v$_x$g$_x$+v$_y$g$_y$+v$_z$g$_z$)−g$^2$t$^2_{stop}$ In the above equation, 2E$_{max}$/m, 2t$_{stop}$ and g$^2$t$^2_{stop}$ are all constants which can be included in the programming code. However, 2t$_{stop}$(v$_x$g$_x$+v$_y$g$_y$+v$_z$g$_z$) is a variable which is computed.

Based on the above equations, the threshold velocity LimitV$_{sq}$ can be calculated.

Figure 3:
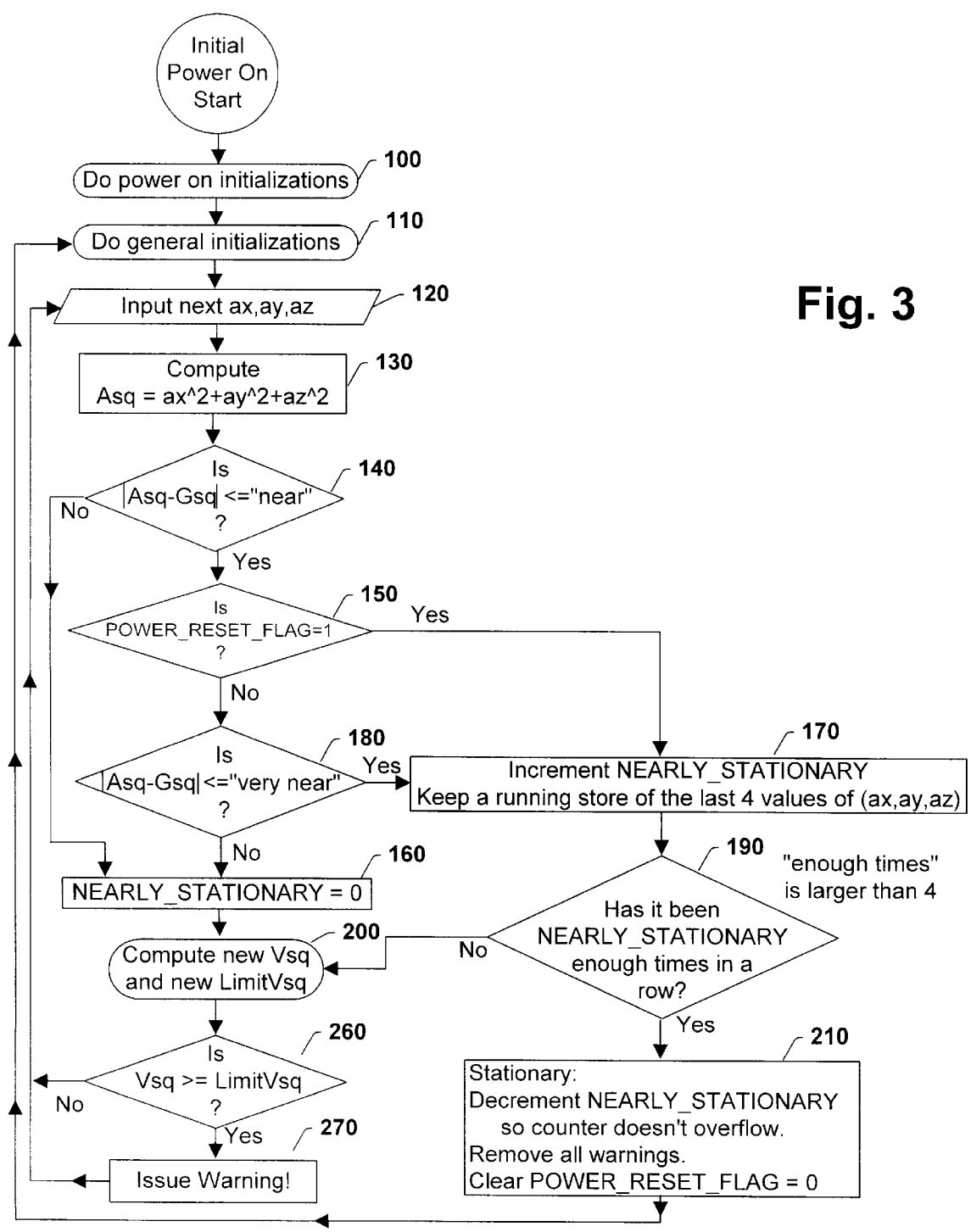
FIG. 3 is a system flowchart suitable for programming the protection system to determine movement of the hard drive in excess of a determined threshold, and to place the hard drive in a protected state upon exceeding the determined threshold in accordance with the present invention.
Figure 4A:
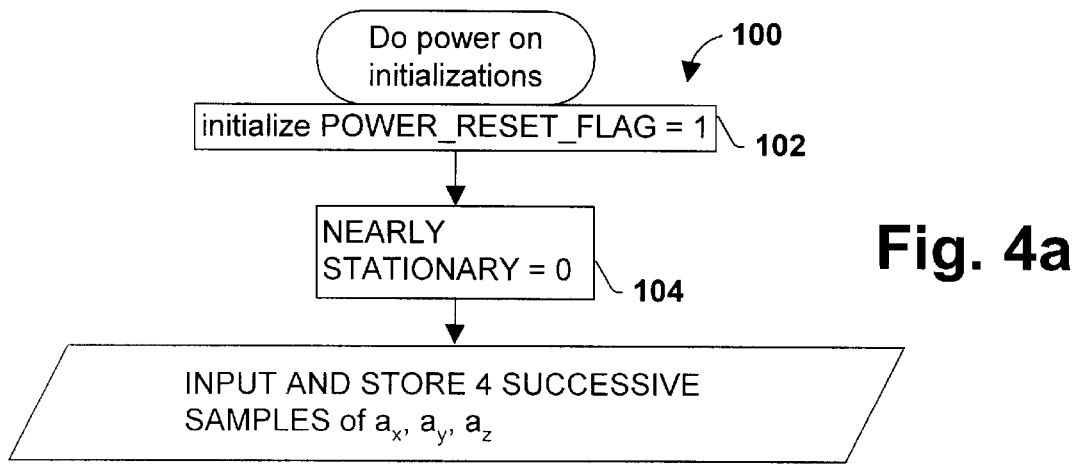
FIG. 4a is a system flowchart of the power-on initializations of the protection system in accordance with the present invention.

Referring now to FIG. 3, the details of the process carried out by the processor 60 in which the protection system of the present invention places the hard drive 13 in a protected state if a determined threshold is exceeded is described. Beginning in step 100, the dedicated processor 60 starts power-on initializations as part of the overall initializations of the dedicated processor 60. Such initializations commence when the dedicated processor 60 is first powered-up, for example. The power-on initialization in step 100 is explained in greater detail in FIG. 4a wherein in step 102, the dedicated processor 60 sets a POWER_RESET_FLAG equal to 1 to indicate that power has just been turned on. The POWER_RESET_FLAG is used by the dedicated processor 60 to give it an opportunity upon start-up to determine what values of a$_x$, a$_y$ and a$_z$ are currently representative of a stationary hard drive 13. As is described in more detail below, with respect to step 210, once it is determined that the hard drive 13 is nearly stationary, the POWER_RESET_FLAG will be cleared so that more precise comparisons can be made to determine when the hard drive 13 is not stationary. In step 104, a counter NEARLY_STATIONARY is reset to 0 by the dedicated processor 60 to indicate that there is no stationary history for the hard drive 13. Finally, In step 106, 4 successive samples of the acceleration vector $\underline{A}$ (a$_x$, a$_y$, a$_z$) are input and stored by the dedicated processor 60 by sampling the output of the accelerometer 62 on the bus 63 in order to have samples to compute the measured acceleration due to gravity $\underline{G}$. The sampling period occurs in fixed intervals and is preferably within the range of 3–30 msec. However, it is understood that the number of samples of the acceleration vector $\underline{A}$ is not limited to 4.

Upon initial power-up, the hard drive is presumably maintained stationary for 1–2 sec while the dedicated processor 60 determines a value for $\underline{G}$. Additionally, the accelerometer should be pre-calibrated at least once so that the acceleration vector $\underline{A}$ exactly changes its sign convention while retaining the same magnitude when it is flipped over 180° while at rest. This pre-calibration should be checked for all three axes (x, y, z). This step is necessary to ensure the system can properly handle a wide variety of device orientations.

Figure 4B:
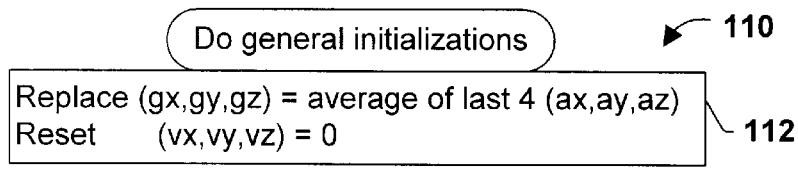
FIG. 4b is a system flowchart of the general initializations of the protection system in accordance with the present invention.

Returning now to FIG. 3, in step 110 the dedicated processor performs general initializations to replace the vector $\underline{G}$ (g$_x$,g$_y$,g$_z$) with the average of the last four samples of the acceleration vector $\underline{A}$ (a$_x$,a$_y$,a$_z$) (this step is illustrated in greater detail at step 112 in FIG. 4b); and the velocity vector $\underline{V}$ (v$_x$,v$_y$,v$_z$) is reset to zero. Next, in step 120, a new sample of the acceleration vector $\underline{A}$ is obtained by the dedicated processor 60 from the accelerometer 62.

In step 130, the dedicated processor 60 determines the magnitude of the acceleration vector squared A$^2$ from the following equations:

$$\text{since } |\underline{A}| = \sqrt{a_x^2 + a_y^2 + a_z^2},$$

then $$A^2 = |\underline{A}|^2 = a_x^2 + a_y^2 + a_z^2$$

The square root of $a^x{}_2 + a^y{}_2 + a^z{}_2$ is not calculated in order to save in computation time. Then, in step 140 the dedicated processor 60 compares $A^2$ – with $g^2$ (9.8 m/sec$^2$)$^2$. The dedicated processor determines if $|A^2 - g^2| \leq$ "near" wherein "near" is a predetermined threshold based on the natural changes in g such as at sea level as compared to mountain level and differences which may occur from natural tolerances associated with equipment and components electronically determining such values. Accordingly, "near" is approximately set to (0.07 m/sec$^2$)$^2$, for example. Therefore, the dedicated processor 60 determines whether $A^2$ is within $\pm(0.07 \text{ m/sec}^2)^2$ of $g^2$. If yes, the dedicated processor 60 moves to step 150; if no, the dedicated processor 60 ascertains that the hard drive 13 is moving and thus the dedicated processor proceeds to step 160.

In step 150, the dedicated processor 60 checks to see if the POWER_RESET_FLAG is still set to equal 1. If it is, this indicates that the dedicated processor 60 may not yet have had a chance to properly calibrate to local gravitational influences. Thus, if yes, the dedicated processor proceeds to step 170 thereby passing the "very near" comparison; if no, the dedicated processor 60 proceeds to step 180 as is described below. At step 170, the NEARLY_STATIONARY counter is incremented and a running store of preferably the last 4 values of the acceleration vector $\underline{A}$ ($a_x$, $a_y$, $a_z$) is kept. However, it is understood that the running store of the values of the acceleration vector $\underline{A}$ is not limited to only 4 values. The NEARLY_STATIONARY counter is used to keep track of whether the hard drive 13 has been stationary for a sufficient amount of time such that it is not necessary to burden the dedicated processor 60 with new velocity calculations. Then, the dedicated processor 60 proceeds to step 190 where it determines if the NEARLY_STATIONARY counter has been incremented enough times in a row—"enough times" being larger than 4, for example. If no, the dedicated processor proceeds to step 210. If yes, the hard drive has been determined to be nearly stationary. Thus, the dedicated processor moves to step 210 where it decrements the NEARLY_STATIONARY counter so that the counter does not overflow, and it removes all warnings and sets the POWER_RESET_FLAG to 0. By setting the POWER_RESET—FLAG to 0, the dedicated processor 60 will thereafter also conduct a "very near" comparison as discussed with respect to step 180. The "very near" comparison differs from the "near" comparison made in step 140 in that the dedicated processor 60 has now had a chance to adjust to local conditions thereby minimizing the uncertainties associated with differences in gravitational pull between sea level and the sky. Then, the dedicated processor returns back to step 110 to restart the routine.

In step 180, the dedicated processor 60 determines if $|A^2 - G^2| \leq$ "very near", wherein "very near" is of smaller value than "near", and is preferably approximately (0.01 m/sec$^2$)$^2$. If yes, the dedicated processor 60 ascertains that the hard drive 13 may be stationary and thus moves to step 170 and performs the routine immediately described above. If no, the dedicated processor 60 has made the determination that the hard drive 13 is not stationary and thus proceeds to step 160 where the NEARLY_STATIONARY counter is reset to 0 and then moves to step 200.

Figure 5:
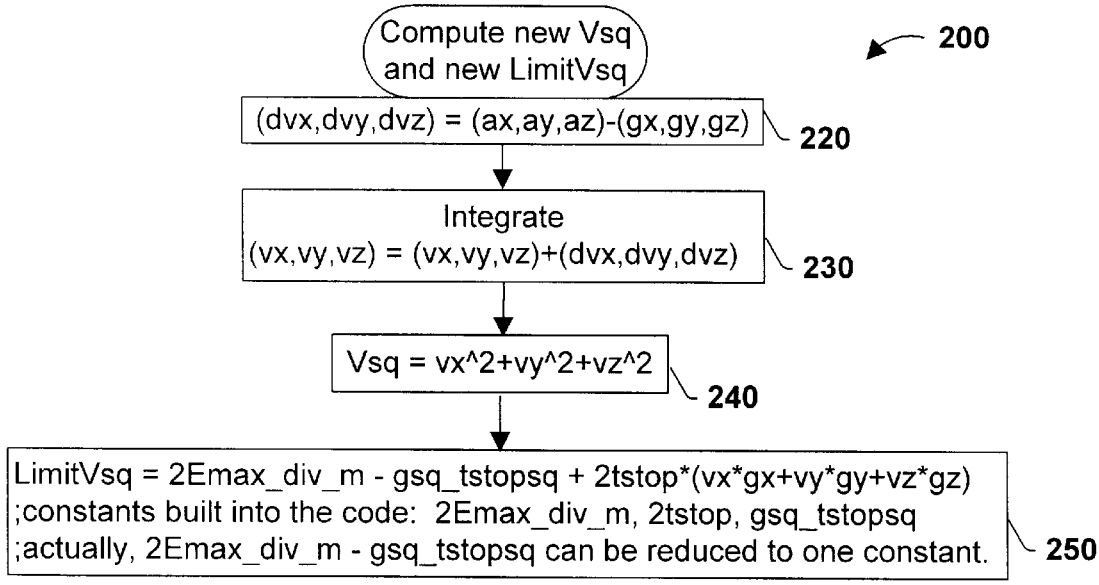
FIG. 5 is a system flowchart for computing velocity and the threshold velocity in accordance with the present invention.

At step 200, a new $V^2$ and new LimitV$_{sq}$ are computed. Referring briefly to FIG. 5, the details of step 200 are provided. Initially, step 220 is performed by the dedicated processor 60 to determine the differential velocity vector ($\partial \underline{V}/\partial t$) via the following equation:

$$\frac{\partial \underline{V}}{\partial t} = \underline{A} - \underline{G}$$

or in other words: $(\partial v_x, \partial v_y, \partial v_z) = (a_x, a_y, a_z) - (g_x, g_y, g_z)$. Then in step 230 the acceleration (i.e., the derivative of the velocity vector, $\partial \underline{V}/\partial t$) is numerically integrated by the dedicated processor 60 to obtain the updated velocity vector:

$$\underline{V} = \int \frac{\partial \underline{V}}{\partial t} = \int \underline{A} - \underline{G}$$

Next, in step 240, the dedicated processor calculates $V^2$:

$$V^2 = |\underline{V}|^2$$

where:

$$V^2 = V^2{}_x + V^2{}_y + V^2{}_z$$

The threshold velocity LimitV$_{sq}$ is subsequently calculated by the dedicated processor in step 250 from the following equation:

$$\text{LimitV}_{sq} = 2E_{max}/m 2t_{stop}(v_x g_x + v_y g_y + v_z g_z) - g^2 t^2{}_{stop}$$

Constants $2E_{max}/m$; $2t_{stop}$; and $-g^2 t^2{}_{stop}$ can be built into the programming code; and, if so desired, $2E_{max}/m - g^2 t^2{}_{stop}$ can be reduced to one constant.

Once the dedicated processor 60 computes the new values for $V^2$ and LimitV$_{sq}$, it proceeds to step 260 where it determines if $V^2 \geq$ LimitV$_{sq}$. If yes, the dedicated processor 60 moves to step 270 where it issues a command in order to place the hard drive 13 in a protected state such as, for example, parking the heads of the hard drive 13 and or braking the disk(s) of the hard drive 13 and/or powering down the hard drive 13; and then proceeds to step 120 to rerun the process. If no, the dedicated processor 60 goes to step 120 and reruns the process.

Figure 6:
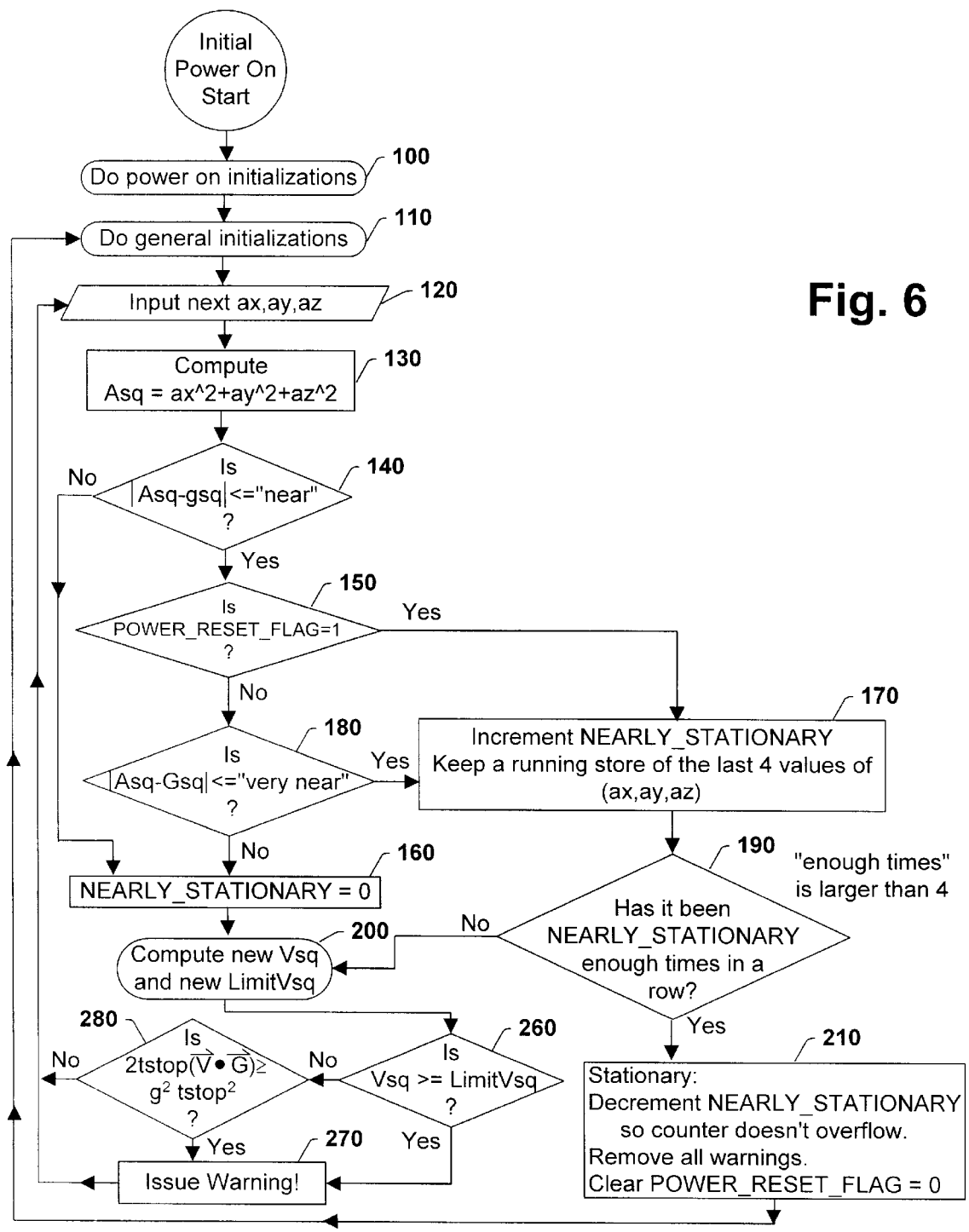
FIG. 6 is a system flowchart suitable for programming the system to determine movement of the hard drive and to place the hard drive in a protected state in accordance with another embodiment of the invention.

In another embodiment of the invention as illustrated in FIG. 6, an additional protective step is added to account for the situation where $V^2$ is not greater than or equal to LimitV$_{sq}$, but the portable computing device 10 has been inadvertently propelled upward to a height where the hard drive could still sustain damage upon impact thereafter. The protective system would operate in a manner similar to that described with reference to FIG. 3, with the exception of step 280. Under the present embodiment, step 280 would follow from step 260 if $V^2$ is not greater than or equal to LimitV$_{sq}$. Then, the dedicated processor 60 would determine if:

$$|2t_{stop}(\underline{V} \cdot \underline{G})| \geq g^2 t^2{}_{stop}$$

other words, if:

$$2t_{stop}(v_x g_x + v_y g_y + v_z g_z) \geq g^2 t^2{}_{stop}$$

If yes, then the dedicated processor proceeds to step 270 where it issues a warning in order to place the drive in a protected state, and then proceeds to step 120 to rerun the process. If no, the dedicated processor 60 goes to step 120 and reruns the process.

Although the invention has been shown and described with respect to certain preferred embodiments, it is obvious that equivalents and modifications will occur to others skilled in the art upon the reading and understanding of the specification. For example, the present invention has been described with respect to determination of the translational velocity of the hard drive 13 exceeding a determined threshold. However, it will be appreciated that the present invention has utility with respect to employing other components indicative of whether the hard drive 13 of the portable computing device 10 needs to be placed in a protected state.

For instance, it is understood that a hybrid protection system utilizing velocity components as described above along with acceleration components to provide staggered levels of protection to the hard drive falls within the scope of his invention. Such a hybrid system may quickly park the heads of the hard drive if, for example: $|A^2-g^2| \geq \text{Limit} A_{sq}$; where $\text{Limit} A_{sq}$ is a threshold acceleration that if exceeded, the hard drive would sustain damage. Parking the heads of the hard drive is significantly faster than powering down the hard drive or braking the disks of the hard drive. In particular, unloading or parking the heads typically takes on the order of 10 ms, while dynamic braking of the disk generally requires 100–200 ms, and powering-down the drive takes longer. Additionally, if the difference in $|A^2-g^2|$ is very large, a high priority warning could be issued to initiate all protective steps (i.e., parking the heads, braking the disks, powering down hard drive, etc.). Thus, the incorporation of such features with that described above could be used to produce a protective system with staggered levels of protection for the hard drive.

Furthermore, as briefly discussed above, look up tables may be used to avoid extraneous digital signal processing or substantial numerical processing. In other words, for example, various predetermined threshold values for velocity and or acceleration of the hard drive with protection steps associated therewith could be stored in the memory 66 of the dedicated processor 60 in order to be compared with the current velocity components and/or acceleration components to readily determine what, if any, protective steps are required.

In yet another embodiment, the protection system of the present invention could be enclosed directly in a hard drive intended for portable operation.

The aforementioned discussion has been generally presented with reference to when the acquired translational velocity squared of the hard drive 13 has exceeded a threshold at which sudden arrest of the hard drive 13 would generate a shock greater than what can be absorbed by mechanical mounting of the hard drive 13 without damaging the hard drive 13. However, it is understood that the subject invention is not limited to employing only translational velocity squared but that any function of translational velocity falls within the scope of the claims. Accordingly, with reference to the claims, the term translational velocity is intended to include any function of translational velocity such as, for example: translational velocity squared, translational velocity cubed, the square root of translational velocity, etc.

The present invention includes all such equivalents and modifications, and is limited only by the scope of the following claims.

What is claimed is:

1. A protection system for a hard drive, comprising:
 a multi-axis accelerometer for generating signals proportional to local acceleration of the hard drive; and
 a processor for monitoring the signals generated by the accelerometer and determining a translational velocity of the hard drive due to acceleration based on the signals generated by the accelerometer, the processor being operative to issue a command to help protect the hard drive from damage due to impact upon determination that the translational velocity of the hard drive due to acceleration exceeds a threshold translational velocity.

2. The protection system of claim 1, wherein the threshold translational velocity is based on the time required to place the hard drive in a protected state.

3. The protection system of claim 1, wherein the processor computes whether the threshold translational velocity of the hard drive has been exceeded by determining the acquired kinetic energy of the hard drive.

4. The protection system of claim 3, wherein the threshold translational velocity is determined based on the following equation:

$$\text{Limit} V_{sq} = 2(E_{max}/m - gh)$$
$$= 2E_{max}/m + 2t_{stop}(v_x g_x + v_y g_y + v_z g_z) - g^2 t_{stop}^2$$

wherein, $\text{Limit} V_{sq}$ is the threshold translational velocity squared, $E_{max}$ is the maximum allowable acquired kinetic energy, which is the sum of how much kinetic energy the hard drive can sustain without damage and the maximum kinetic energy that can be absorbed by mounting components; $t_{stop}$ is the time it takes to place the hard drive in a protective state; m is the mass of the hard drive; h is the distance the hard drive falls during $t_{stop}$; and g is about 9.8 m/sec$^2$; $g_x$ and $g_y$ and $g_z$ are the scaler components of the measured local acceleration due to gravity ($\underline{G}$) of the hard drive; and $v_x$ and $v_y$ and $v_z$ are the scaler components of the translational velocity ($\underline{V}$) of the hard drive.

5. The hard drive protection system of claim 4, wherein the processor initiates protection of the hard drive when: $|2t_{stop}(\underline{V} \cdot \underline{G})| \geq g^2 t_{stop}^2$.

6. The protection system of claim 1, wherein the processor is operative to power-down the hard drive when the translational velocity exceeds the threshold translational velocity.

7. The protection system of claim 1, wherein the processor is operative to park the heads of the hard drive when the translational velocity exceeds the threshold translational velocity.

8. The protection system of claim 1, wherein the processor is operative to brake at least one spinning disk of the hard drive when the translational velocity exceeds the threshold translational velocity.

9. The protection system of claim 1, wherein the translational velocity is based on an acceleration vector due to gravity of the hard drive when the hard drive is stationary.

10. A protection system for a hard drive, comprising:
 a multi-axis accelerometer for generating signals proportional to local acceleration of the hard drive; and
 a processor for monitoring the signals generated by the accelerometer and determining a translational velocity of the hard drive due to acceleration based on the signals generated by the accelerometer, the processor being operative to issue a command to protect the hard drive upon determination that the translational velocity of the hard drive exceeds a threshold translational velocity;
 wherein the translational velocity of the hard drive is determined based on a measured local acceleration vector and a measured local acceleration vector due to gravity.

11. The protection system of claim 10, wherein the threshold translational velocity is based on the time required to place the hard drive in a protective state.

12. The protection system of claim 10, wherein the processor computes whether the threshold translational velocity of the hard drive has been exceeded by determining the acquired kinetic energy of the hard drive.

13. The protection system of claim 10, wherein the processor turns off the hard drive when the translational velocity exceeds the threshold translational velocity.

14. The protection system of claim 10, wherein the processor parks the heads of the hard drive when the translational velocity exceeds the threshold translational velocity.

15. The protection system of claim 10, wherein the processor unloads the hard drive when the translational velocity exceeds the threshold translational velocity.

16. The protection system of claim 10, wherein the processor disables the hard drive when the translational velocity exceeds the threshold translational velocity.

17. The protection system of claim 10, wherein the processor brakes at least one spinning disk of the hard drive when the translational velocity exceeds the threshold translational velocity.

18. The protection system of claim 10, wherein the threshold translational velocity is determined based on the following equation:

$$LimitV_{sq} = 2(E_{max}/m - gh)$$
$$= 2E_{max}/m + 2t_{stop}(v_x g_x + v_y g_y + v_z g_z) - g^2 t_{stop}^2$$

wherein, $LimitV_{sq}$ is the threshold translational velocity squared, $E_{max}$ is the maximum allowable acquired kinetic energy, which is the sum of how much kinetic energy the hard drive can sustain without damage and the maximum kinetic energy that can be absorbed by mounting components; $t_{stop}$ is the time it takes to safely disengage the hard drive; m is the mass of the hard drive; h is the distance the hard drive falls during $t_{stop}$; and g is about 9.8 m/sec$^2$; $g_x$ and $g_y$ and $g_z$ are the scaler components of the measured local acceleration due to gravity (<u>G</u>) of the hard drive; and $v_x$ and $v_y$ and $v_z$ are the scaler components of the translational velocity (<u>V</u>) of the hard drive.

19. The hard drive protection system of claims 18, wherein the processor initiates protection of the hard drive when: $|2t_{stop}(\underline{V} \cdot \underline{G})| \geq g^2 t_{stop}^2$.

20. A protection system for a hard drive, comprising:
an accelerometer for generating signals proportional to local acceleration of the hard drive; and P1 a processor for monitoring the signals generated by the accelerometer, the processor being operative to issue a command to protect the hard drive upon determining that a translational velocity vector of the hard drive is of such magnitude that the hard drive would sustain damage upon impact.

21. A method for protecting a hard drive, comprising the steps of:
employing a multi-axis accelerometer to generate signals proportional to the local acceleration of the hard drive;

using a processor to monitor the signals generated by the accelerometer and determine a translational velocity of the hard drive due to acceleration based on the signals generated by the accelerometer; and initiating steps to protect the hard drive upon determining that the translational velocity of the hard drive exceeds a threshold translational velocity;

wherein the translational velocity of the hard drive is determined based on a measured local acceleration vector and a measured local acceleration vector due to gravity.

22. The method for protecting a hard drive of claim 21 wherein the threshold translational velocity is determined based on the following equation:

$$LimitV_{sq} = 2(E_{max}/m - gh)$$
$$= 2E_{max}/m + 2t_{stop}(v_x g_x + v_y g_y + v_z g_z) - g^2 t_{stop}^2$$

wherein, $LimitV_{sq}$ is the threshold translational velocity squared, $E_{max}$ is the maximum allowable acquired kinetic energy, which is the sum of how much kinetic energy the hard drive can sustain without damage and the maximum kinetic energy that can be absorbed by mounting components; $t_{stop}$ is the time it takes to safely disengage the hard drive; m is the mass of the hard drive; h is the distance the hard drive falls during $t_{stop}$; and g is about 9.8 m/sec$^2$; $g_x$ and $g_y$ and $g_z$ are the scaler components of the measured local acceleration due to gravity (<u>G</u>) of the hard drive; and $v_x$ and $v_y$ and $v_z$ are the scaler components of the translational velocity (<u>V</u>) of the hard drive.

* * * * *